United States Patent [19]
Cockrell

[11] Patent Number: 5,340,627
[45] Date of Patent: Aug. 23, 1994

[54] FABRIC CRAFT ARTICLE

[76] Inventor: Patricia J. Cockrell, 496 S. Parahan Rd., York, S.C. 29745

[21] Appl. No.: 717,962

[22] Filed: Jun. 20, 1991

[51] Int. Cl.$^5$ ............... B32B 31/16; B44C 1/10
[52] U.S. Cl. .................. 428/39; 428/159; 428/542.2
[58] Field of Search ............ 156/63, 92, 93; 428/102, 906.6, 158, 7.11, 39, 133, 156, 159, 542.2, 102, 158

[56] References Cited

U.S. PATENT DOCUMENTS

| | | | |
|---|---|---|---|
| 2,291,935 | 8/1942 | Woodall et al. | 156/212 |
| 3,016,317 | 1/1962 | Brunner | 428/138 |
| 3,160,549 | 12/1964 | Caldwell et al. | 428/316.6 X |
| 3,236,368 | 2/1966 | Eisen | 428/13 X |
| 3,240,176 | 3/1966 | Morrison | 156/148 X |
| 3,352,741 | 11/1967 | Miller | 428/160 |
| 3,570,435 | 3/1971 | Morrison | 156/63 X |
| 3,619,336 | 11/1971 | Hughes | 428/102 X |
| 4,355,722 | 10/1982 | Lemmeyer | 156/63 X |
| 4,445,950 | 6/1984 | Browning | 156/63 |
| 4,514,175 | 4/1985 | Zaruba et al. | 428/39 X |
| 4,521,474 | 6/1985 | Berman | 434/95 X |
| 4,525,393 | 6/1985 | DiCostanzo | 428/906.6 X |
| 4,814,218 | 3/1989 | Shane | 428/102 |

*Primary Examiner*—Henry F. Epstein
*Attorney, Agent, or Firm*—Bell, Seltzer, Park & Gibson

[57] ABSTRACT

The present invention involves a fabric craft article and an associated method and kit for producing making the same. The disclosed fabric craft article comprises a substrate having a design depicted in the surface thereof by scored channels or grooves extending into the surface of the substrate, which design is defined by discrete design sections each having a predetermined shape and size; a discontinuous padding layer carried by the substrate; and in turn a discontinuous fabric layer which secures the padding layer to the substrate. The padding layer is defined by discrete padding sections, each of which corresponds to the predetermined shape and size of a different one of the design sections. The discontinuous fabric layer overlies the padding layer, and is defined by a plurality of discrete fabric sections, each of which corresponds in shape to the predetermined shape of one of the design sections, but is of a size larger than that of the corresponding design section such that the peripheral edges of each fabric section extends beyond the peripheral edges of the corresponding design section in each lateral dimension. The corresponding padding and fabric sections are located in registration with the corresponding design sections and the peripheral edges of the fabric sections are adhesively tucked into the scored channels or grooves which define the design sections to thereby adhesively secure the padding and fabric sections to the substrate. The disclosed kit includes all of the necessary material and a tool for construction a fabric craft article of a predetermined design.

8 Claims, 1 Drawing Sheet

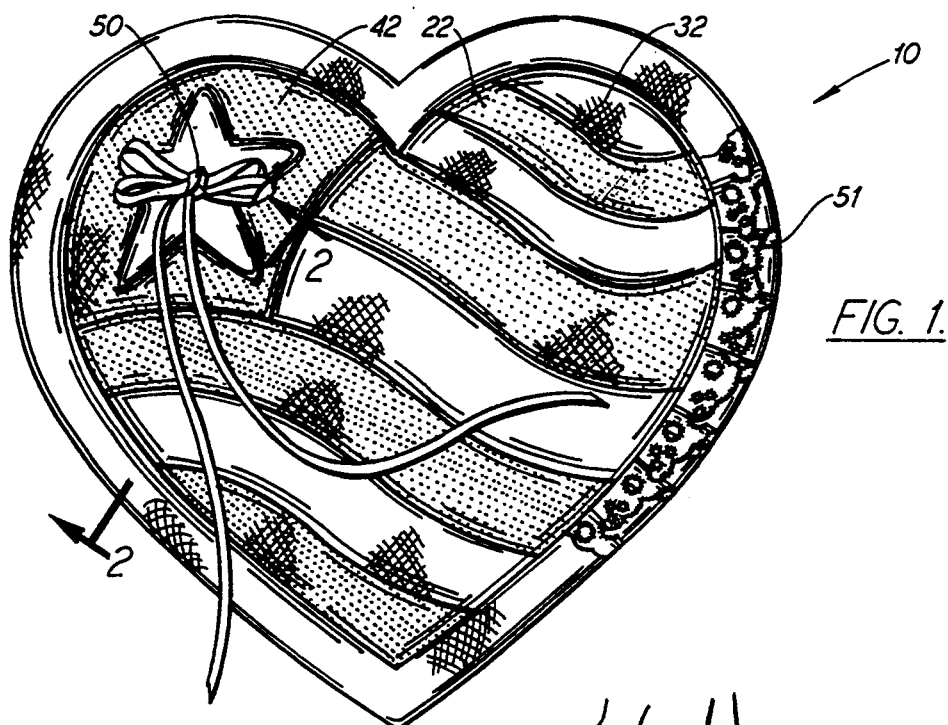
FIG. 1.
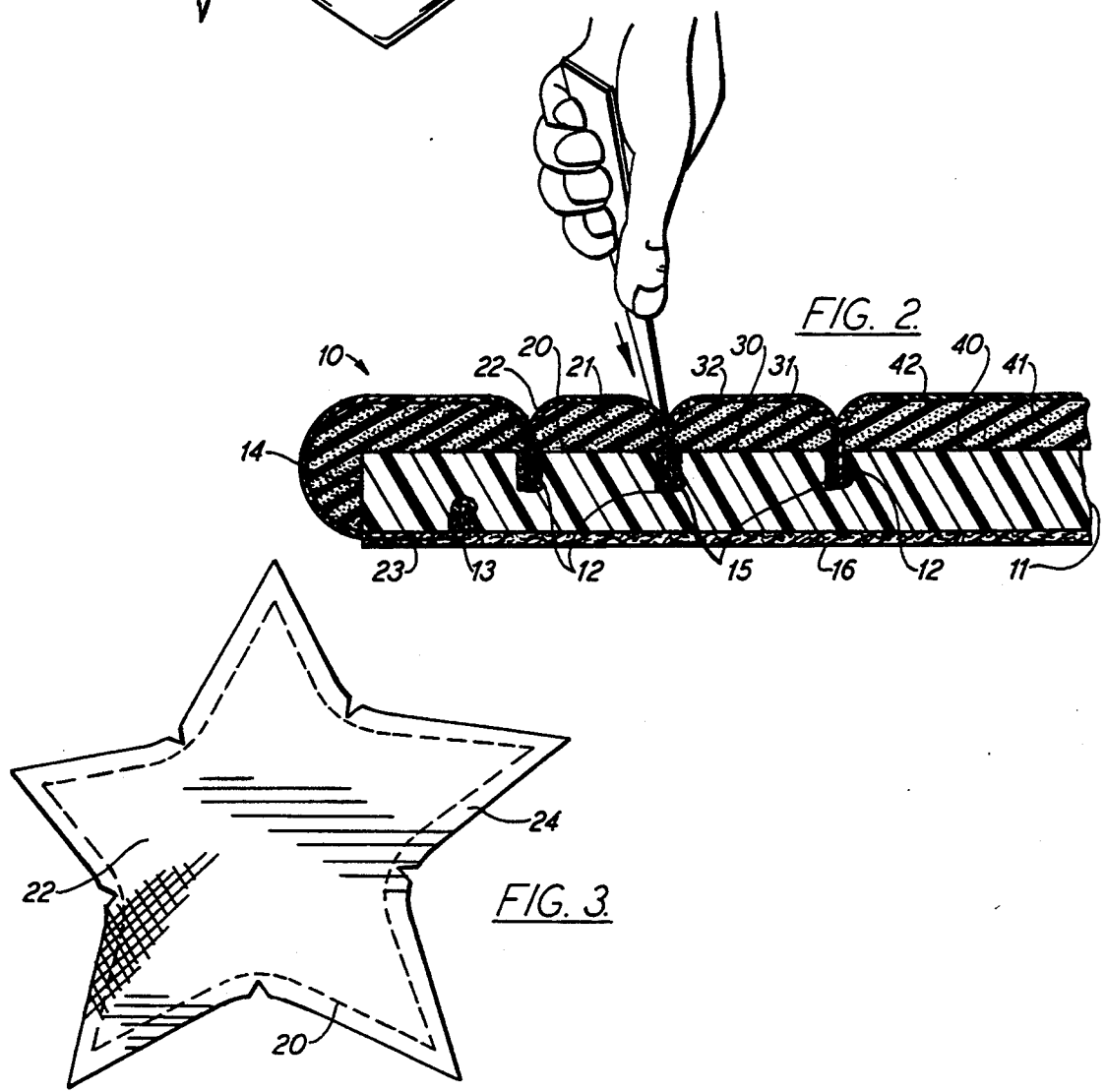
FIG. 2.
FIG. 3.

FABRIC CRAFT ARTICLE

FIELD OF THE INVENTION

The present invention relates to a fabric craft article and more particularly, to a fabric craft article and a method and a kit for making the same, wherein the article is characterized by various types and textures of fabric which have been arranged and fastened to a substrate in a decorative fashion.

BACKGROUND OF THE INVENTION

Various craft articles similar to that disclosed herein are known in the art. For example, U.S. Pat. No. 4,514,175 to Zaruba, et al. discloses a reusable craft kit which comprises a rigid background board with a playful design depicted on its front surface. Various portions of the design are defined by openings in the background board which extend through its depth. Backing pieces that conform in shape to the openings extending through the background board, but which are slightly smaller than the openings are included in the kit. These backing pieces may be covered with padding and an appropriately colored fabric and inserted into the corresponding holes in the background board to allow the artisan to add a personal touch to the depicted design. When the backing pieces are covered by padding and fabric and inserted into the corresponding openings, the peripheral edges of the fabric become wedged between the circumferential edge of the backing piece and the defining edge of the corresponding opening to frictionally secure the covered backing pieced within the background board. By completing the craft set in this fashion, one can create a design having three-dimensional accentuated areas.

Because the craft kit disclosed in the Zaruba patent depends upon the frictional relationship between the background board and the associated backing pieces to secure the padded sections to the background board, there must of necessity be portions of the design which remain uncovered by padding or fabric. Accordingly, only various portions of the overall design can be depicted in a three-dimensional manner.

U.S. Pat. No. 4,814,218 to Shane discloses a quilted craft article and method for making the same. The disclosed article comprises a substrate in which slits on the surface define a pattern for the quilted article and individual sections of the overall pattern. In the method, the quilted craft article is adorned with preselected pieces of fabric by selecting fabric pieces corresponding in shape to, yet are slightly larger than, the individual sections of the pattern. Accordingly, the peripheral edges of the fabric sections can be grippingly fastened to the substrate material by tucking the peripheral edges of the fabric sections into the slits and thus into the interior of the substrate.

Although the craft article disclosed in the Shane patent overcomes the problems associated with the Zaruba article, i.e. that only portions of the overall design may be covered by the fabric, the Shane construction has proven undesirable in practice because the "gripping" engagement of the fabric sections provided within the slits formed in the substrate lacks sufficient strength to maintain the integrity of the craft article over an extended period of time. That is, the tucked edges of the fabric sections are free to become disengaged from the substrate, and over time tend to do so, thus destroying the aesthetic nature of the craft article.

In addition, the Shane construction is ornamentally undesirable because it yields a flat or two-dimensional product lacking a truly soft or "cushioned" appearance.

Another craft article similar to that disclosed by Shane is known in the art, but is not the subject of a patent. This article avoids the undesirable aesthetic attributes which burden the Shane construction by employing a loose-fill padding layer between the substrate and fabric layer. This construction supplies the desired "cushioned" appearance, yet does not solve, and in fact aggravates, the integrity problem which renders the Shane construction impractical. In addition, because this approach contemplates a loose-fill padding layer, it is attended by an untidy fabrication process as well as a similarly untidy problem should the fabric sections eventually become dislodged from the substrate. Furthermore and also due to the loose nature of the padding material used in this type of construction, the "cushioned" areas in this type of craft article are prone to lose their uniform shape and appearance with age. Such undesirable attributes are the result of movement of the padding material within the "cushioned" areas in response to, for example, rough handling or gravity.

Accordingly, it is the object of the present invention to provide a fabric craft article that overcomes the problems associated with these conventional articles, yet one which can be simply and economically produced.

More particularly, it is an object of the present invention to provide a fabric craft article having a three-dimensional topography across its entire face, while at the same time maintaining the structural integrity of the article over extended periods of time.

SUMMARY OF THE INVENTION

The objects of the present invention have been realized by producing a fabric craft article comprising a substrate, a discontinuous padding layer carried on the substrate, and a discontinuous fabric layer overlying the padding layer and adhesively secured within channels or grooves formed within the substrate.

The fabric craft article of the present invention is produced by scoring within the surface of the substrate channels or grooves representative of the overall design to be depicted by the fabric craft article, as well as discrete design sections within the overall design. Next, discrete self-cohesive padding sections which substantially correspond in size and shape to the aforementioned discrete design sections are placed on the upper surface of the substrate to form a discontinuous padding layer. The padding sections are then covered by discrete fabric sections which in turn substantially correspond in shape to the various discrete design sections. These fabric sections are slightly larger than the discrete design and padding sections in each lateral dimension such that the peripheral edges of the fabric sections extend beyond the peripheral edges of the design and padding sections. Finally, the fabric craft article is completed by adhesively securing the peripheral edges of the discrete fabric sections within and to the substrate by adhesively tucking the same within the scored channels or grooves in the substrate which define the respective design sections.

By attaching the fabric layers to the substrate in this fashion, the padding layer can be segregated into discrete pillow sections underlying each fabric section to produce an overall "cushioned" appearance across the entire face of the fabric craft article. In so doing, the present invention provides a fabric craft article which displays a three-dimensional appearance across its total face, thus overcoming the problem associated with the conventional constructions discussed above. In addition, by employing a self-cohesive padding layer between the substrate and the fabric layer, there is provided a fabric craft article which overcomes the aesthetic and untidiness problems which have plagued the Shane construction. Finally, by providing an adhesive material to secure the peripheral edges of the fabric section into the substrate material, the invention similarly overcomes the integrity problems experienced with the conventional constructions.

BRIEF DESCRIPTION OF THE DRAWINGS

Some of the objects and advantages of the present invention having been stated, others will appear as the description proceeds, when taken in conjunction with the accompanying drawings, in which:

FIG. 1 is a pictorial representation of one example of a fabric craft article according to the present invention;

FIG. 2 is a cross sectional view of the fabric craft article shown through plane 2—2 of FIG. 1; and FIG. 3 is a representative view of a discrete fabric section for use in the fabric craft article shown in FIG. 1.

DESCRIPTION OF THE PREFERRED EMBODIMENTS

Referring more specifically to the drawings, there is shown in FIG. 1 an example of the fabric craft article of the present invention. FIG. 1 exemplifies a heart shaped article carrying a modified American flag motif. It will, of course, be understood that any design of the artisan's choosing may be employed, the displayed flag motif only being one example.

As illustrated in FIGS. 1 and 2, the article 10 is characterized by a substrate 11 having front-side channels or grooves 12 and back-side channels or grooves 13 scored in the surface thereof to define the overall design chosen to adorn the article. These channels or grooves 12 and 13 also define a plurality of discrete design sections 20, 30 and 40 which corporately make up the overall design pattern. A plurality of padded sections 21, 31 and 41 are carried on the substrate 11, which sections overlay the correspondingly sized and shaped design sections in registration. As shown in FIG. 2, the padding sections 21, 31 and 41 are covered with corresponding fabric sections 22, 32 and 42 which serve to secure the same to the substrate 11. As can be seen, the padding sections 21, 31 and 41 are secured to the substrate 11 by tucking the outer peripheral edges of the fabric sections 22, 32 and 42 into the channels or grooves 12 and 13 which have been scored into the surface of the substrate 11. The so-covered padding sections form discrete pillow areas which together give an overall "cushioned" appearance to the article 10.

As shown specifically in FIG. 2, the present invention advantageously overcomes the untidiness and uniformity problems associated with the known craft articles discussed above by using a self-cohesive padding material instead of a loose-fill material to form the discrete pillow areas of the overall design. Such a padding material by its very nature maintains both its integrity and shape and thus is neither susceptible to fragmentation during the fabrication process nor settling should the craft article be displayed in tilted or vertical fashion.

In the illustrated flag example, the padded sections 21 are covered with red fabric sections 22, sections 31 are covered with white fabric sections 32 and section 41 is covered with blue fabric section 42 to produce the overall flag motif. In the example shown, a ribbon bow 50 and a lace edge trim 51 are attached to the fabric craft article to further accentuate the three-dimensional quality of the overall design.

The padding sections 21, 31 and 41 generally assert an upward pressure on the fabric sections securing the padding to the substrate, thus tending to dislodge the edges of the fabric sections from within the channels or grooves 12 and 13 formed in the substrate. The present invention advantageously addresses this problem by adhesively affixing the peripheral edges of the fabric sections 22, 32 and 42 within the channels or grooves 12 and 13. This may be accomplished either by applying an adhesive 15 to the edges of the fabric sections prior to tucking the same into the channels or grooves, or by injecting the adhesive into the channels or grooves prior to inserting the fabric edges therein. In this latter case, the adhesive should advantageously be injected into the channels or grooves as deep as is possible in order to ensure that the adhesive does not become visible in the finished product. In any event, the presence of the adhesive 15 within the channels or grooves greatly improves the integrity of the overall craft article 10 and maintains the appearance of the article over extended periods of time.

In addition, as shown in FIG. 2, the edge faces 14 of the substrate 11 can be incorporated into the overall design by wrapping the outer edges 23 of the peripheral fabric sections around the edge faces 14 of the substrate material and adhesively tucking the same into channels or grooves 13 formed in the back-side of the substrate.

Further, the overall structural integrity of the fabric craft article be can be enhanced by providing on the back-side of the substrate material an optional backing layer 16 to complete the overall article. This backing layer be is of a size and shape which substantially corresponds to the size and shape of the substrate and may advantageously be made of kraft paper, fabric, cardboard, plastic sheeting, or the like.

As alluded to above, the three-dimensional quality of the overall fabric craft article design may be further accentuated by applying various ornaments to the article in addition to the above described padding and fabric layers. These ornaments may form a major and integral part of the overall depicted design, such as, for example, the floppy ears of a pictured animal or balloons seemingly tethered to a pictured lad. In such an embodiment, the ornament may be flexibly anchored to the substrate layer and may extend forwardly of the surface of the same so as to accentuate the perceived depth of the overall design. In addition, ornaments may be used merely to provide a finishing touch to an otherwise complete design. In either event, these ornaments may include fabric-covered or solid design shapes, ribbon, lace, bows, sequins, pins, glitter or other like embellishments. Depending on the nature of the ornaments used, the ornaments may be adhesively tucked into the channels or grooves 12, attached to the face of the fabric craft article by tape or adhesive, or adhered to the fabric craft article by pinning or stapling the same to the substrate through the fabric and padding layers.

The present invention also contemplates a method for making the fabric craft article described above. The invention is produced by first cutting to size a piece of the substrate material 11, and sanding the edges thereof to the desired shape. A design or picture is then drawn or otherwise indicated on the surface of the substrate and lines representing the design are scored into the surface of the substrate 11, making channels or grooves 12 and 13, of approximately one eighth inch to one half inch in depth. The channels or grooves may be scored individually by use of a knife-like tool or the design may scored all at one time, such as by stamping, die-cutting or other more commercially feasible large scale operations.

Next, discrete self-cohesive padding sections 21, 31 and 41 are placed above the corresponding design sections 20, 30 and 40 to form an overall discontinuous padding layer carried on the surface of the substrate material 11. The shape and size of the padding sections substantially correspond to the shape and size of the design sections 20, 30 and 40, respectively. Finally, the fabric sections 22, 32 and 42 are prepared by choosing a fabric of appropriate color and texture, and cutting the fabric into sections which substantially conform to the shape of corresponding design sections 20, 30 and 40. These fabric sections, as exemplified in FIG. 3 with respect to one fabric section 22, are oversized in reference to the corresponding design section 20 in all lateral dimensions such that the fabric section 22 contains an outer peripheral edges 24 which exceeds the predetermined boundary of corresponding design section 20.

These fabric sections are placed atop the various corresponding padding sections in substantial registration with the corresponding design sections, and the peripheral edges 24 thereof are adhesively tucked into the channels or grooves 12 and 13 formed in the substrate to produce the cushioned appearance of the overall article. Once all the necessary cushioned sections are properly secured to the substrate material, the backing layer 16 may be secured to the rear surface of the substrate 11 and any additional ornaments which are to adorn the fabric craft article may be attached by adhesive, tape, or mechanical fastener.

Lastly, the present invention includes a fabric craft article kit including all of the necessary material and a tool for self-construction of a pre-designed fabric craft article. Included in the kit is (a) a substrate preform to be shaped and sized by the user; (b) sufficient padding material and fabric to allow these layers to be prepared and attached to the substrate for construction of the desired craft article; (c) a tool for scoring the channels or grooves into the substrate and for tucking the peripheral edges of the fabric sections into the substrate; (d) an adhesive for adhering the edges of the fabric sections within the channels or grooves in the substrate; and (e) a backing layer for attachment to the back-side of the substrate. The tool mentioned above can be, for example, a hand-held implement with a blade protruding from one end for scoring the substrate material and for later tucking the edges of the fabric sections into the scored channels or grooves. In addition, the tool may advantageously include a hook or barb attached to the end opposite the blade for adjusting the amount of tension applied to the fabric sections and thus the appearance of the overall design.

In the present invention, the substrate material may be made of pliable or rigid polymeric foam, such as styrofoam, less rigid foams of the type used by florists to support flower arrangements, or the like. The substrate is, of course, shaped to define the overall shape of the fabric craft article and may be of any exterior shape, for example, it may be generally planar as shown in FIGS. 1 and 2, or of a variant three-dimensional shape such as spherical, conical, or cylindrical.

The padding layer, may be constructed of a pliable foam rubber or other self-cohesive padding material.

The fabric may be of any texture and/or color as desired or as necessary to produce the desired overall design.

In the figures and specification, there has been disclosed an example of the present invention, however, while specific terms have been employed, they are used in a generic and descriptive sense only, and not for the purpose of limiting the scope of the invention set forth in the following claims.

That which is claimed is:

1. A fabric craft article comprising:
   a substrate having at least one exterior surface:
   a plurality of scored channels or grooves extending into and forming a design in said substrate, said design being defined by discrete design sections each having a predetermined shape and size;
   a plurality of discrete self-cohesive padding sections carried on said substrate, each of said padding sections being of a shape and size which substantially corresponds to said predetermined shape and size of a different one of said design sections, whereby said padding sections are laid on said substrate in registration with said corresponding design sections to form a discontinuous padding layer on said substrate;
   a plurality of discrete fabric sections overlaying said padding layer, each of said fabric sections substantially corresponding in shape to said predetermined shape of a different one of said design sections, but of a size larger than said corresponding design section such that the peripheral edges of said fabric sections extend beyond the peripheral edges of said corresponding design sections in each lateral dimension, wherein said fabric sections are located in registration with said corresponding padding and design sections and said peripheral edges of said fabric sections are tucked into said scored channels or grooves which define said design sections thereby securing said padding and fabric sections to said substrate; and
   an adhesive contained within said channels or grooves for adhesively securing said edges of said fabric sections within said substrate.

2. A fabric craft article according to claim 1 wherein said substrate comprises a rigid polymeric foam.

3. A fabric craft article according to claim 1 wherein said padding sections comprise pliable foam.

4. A fabric craft article according to claim 1 and further comprising one or more decorative ornaments attached to said article.

5. A fabric craft article according to claim 4 wherein said one or more decorative ornaments are attached to said article by an adhesive.

6. A fabric craft article according to claim 4 wherein said one or more decorative ornaments are attached to said article by a mechanical fastener.

7. A fabric craft article according to claim 1 wherein said substrate further comprises a second exterior surface and wherein a backing layer is affixed to said second surface of said substrate.

8. A fabric craft article according to claim 7 wherein said backing layer is selected from the group consisting of kraft paper, fabric, cardboard and plastic sheeting.

* * * * *

UNITED STATES PATENT AND TRADEMARK OFFICE
CERTIFICATE OF CORRECTION

PATENT NO. : 5,340,627

DATED : August 23, 1994

INVENTOR(S) : Patricia J. Cockrell

It is certified that error appears in the above-identified patent and that said Letters Patent is hereby corrected as shown below:

Col. 4, line 40 "be" (first occurrence) should be --10--

Col. 4, line 43 "be" should be --16--

Col. 6, line 18, after "surface" the colon (:) should be a semicolon (;)

Signed and Sealed this

Twenty-eight Day of February, 1995

*Attest:*

BRUCE LEHMAN

*Attesting Officer*     *Commissioner of Patents and Trademarks*